United States Patent
Luk

(10) Patent No.: US 7,221,655 B2
(45) Date of Patent: May 22, 2007

(54) APPARATUS AND METHOD FOR CACHING COUNTER VALUES IN NETWORK PACKET TRAFFIC SAMPLING

(75) Inventor: King Luk, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 10/098,880

(22) Filed: Mar. 12, 2002

(65) Prior Publication Data

US 2003/0174655 A1 Sep. 18, 2003

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. ............ 370/252; 370/232; 370/241; 370/463; 709/224

(58) Field of Classification Search ........ 370/229–252, 370/389–412, 463–474; 709/224–226
See application file for complete search history.

(56) References Cited

U.S. PATENT DOCUMENTS

| 5,315,580 | A  | * | 5/1994 | Phaal | ................... 370/232 |
| 5,878,420 | A  | * | 3/1999 | de la Salle | ............ 707/10 |
| 6,584,111 | B1 | * | 6/2003 | Aweya et al. | .......... 370/412 |
| 6,920,112 | B1 | * | 7/2005 | McCloghrie et al. | ... 370/252 |
| 6,934,896 | B2 | * | 8/2005 | Larson et al. | ......... 714/724 |
| 6,976,154 | B1 | * | 12/2005 | Dyckerhoff et al. | .... 712/220 |
| 2001/0056486 | A1 | * | 12/2001 | Kosaka | ............... 709/224 |
| 2002/0054594 | A1 | * | 5/2002 | Hoof et al. | ........... 370/389 |
| 2003/0169764 | A1 | * | 9/2003 | Lavigne et al. | ....... 370/463 |
| 2005/0190695 | A1 | * | 9/2005 | Phaal | .................. 370/229 |

* cited by examiner

*Primary Examiner*—M. Phan

(57) ABSTRACT

A method of caching counter values in network packet traffic sampling, includes: generating a pre-sample strobe; loading the pre-sample strobe into a counter cache; waiting for the next strobe; and generating a sample pulse when the next strobe arrives. An apparatus for counting packet values and for sampling the values, includes: a packet sampling processor including a counter cache, the packet sampling processor responsive to a pre-sample strobe so that the pre-sample strobe updates the counter cache, where a sample pulse is generated when the next strobe arrives.

31 Claims, 6 Drawing Sheets

APPARATUS AND METHOD FOR CACHING COUNTER VALUES IN NETWORK PACKET TRAFFIC SAMPLING

TECHNICAL FIELD

This disclosure relates generally to network packet switching technology, and more particularly to an apparatus and method for caching counter values in network packet traffic sampling.

BACKGROUND

Data packets that come across a networking switch may be sampled for a given number of packets. For example, every 200 packets may be sampled, and this sampled value may then be sent to another module for processing. In one approach, the sampling signal is generated by using one (1) fixed-width counter per switch port, and the counter is replicated two (2) times for every port in the switch product. This type of implementation takes a significant amount of resources on the chip, particularly as the number of ports increases, and this typically increases the cost of the final product.

In another approach that use a pipelined design, counter resources may be shared and this leads to some savings in chip resources. However, this approach is not able to generate a sample signal after the strobe generation in a timely manner for some applications, since the sharing of counter resources introduces latency in the design. This can result in an inaccurate count of the packets that are sampled.

Therefore, the current technologies are limited to particular capabilities and suffer from various constraints.

SUMMARY

In accordance with an embodiment of the invention, a method of caching counter values in network packet traffic sampling, includes: generating a pre-sample strobe; loading the pre-sample strobe into a counter cache; waiting for the next strobe; and generating a sample pulse when the next strobe arrives.

In another embodiment of the present invention, an apparatus for counting packet values and for sampling the values, includes: a packet sampling processor including a counter cache, the packet sampling processor responsive to a pre-sample strobe so that the pre-sample strobe updates the counter cache, where a sample pulse is generated when the next strobe arrives.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
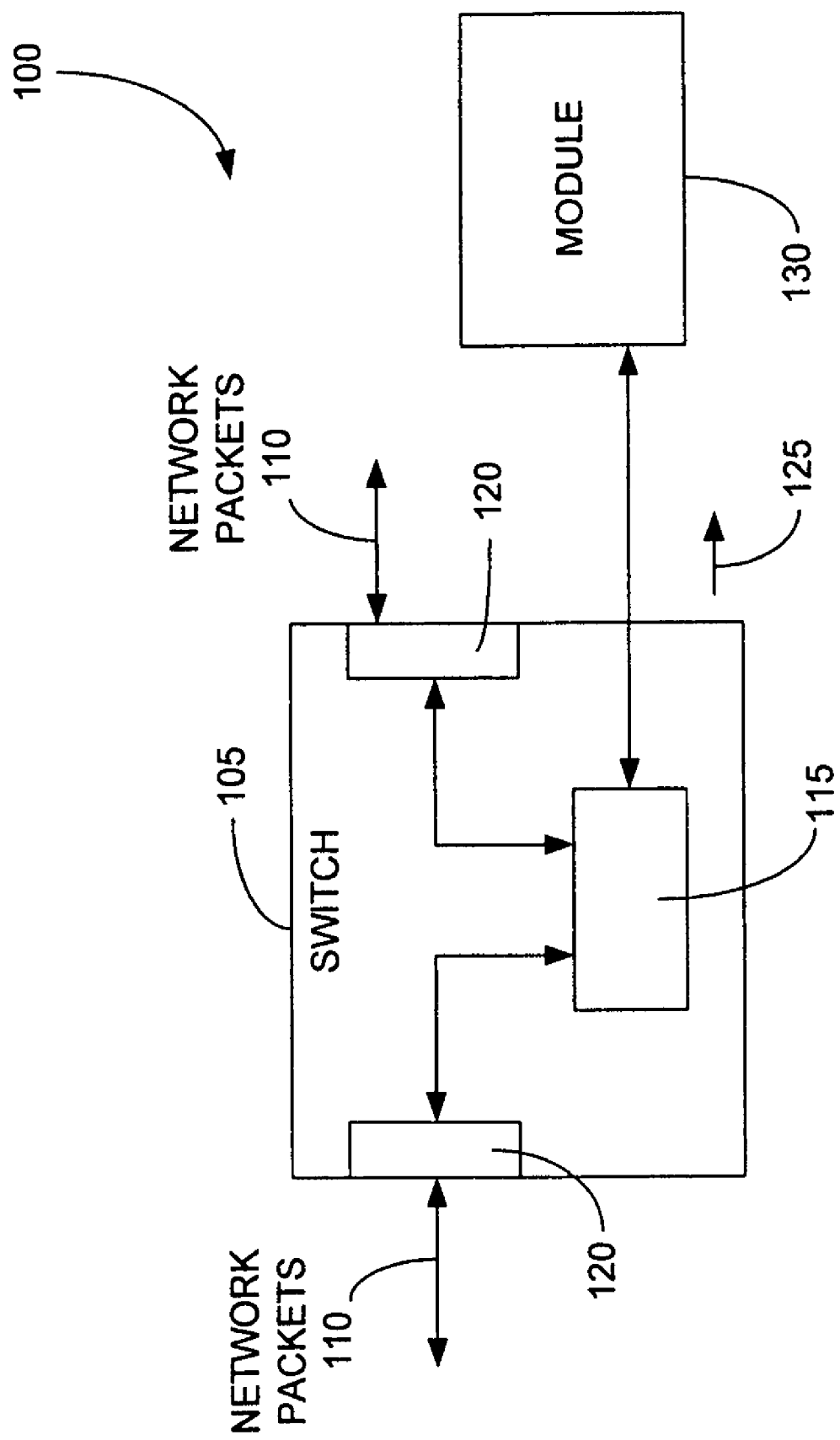
FIG. 1 is a block diagram of an apparatus that can implement an embodiment of the present invention.

FIG. 1 is block diagram of an apparatus 100 that can implement an embodiment of the present invention. A network switch 105 (or other packet transmitting element) can receive and switch multiple network packets 110. A packet sampling processor 115 can count and sample network packets 110 that are transmitted through the ports 120 of the network switch 105. The packet sampling processor 115 can provide packet sample values 125 to a module 130 for processing. In one embodiment, the packet sampling processor 115 is a pipelined processor with instructions for counting packets and with circuitry to generate the output sample signals upon pre-defined conditions. In one embodiment, the packet sampling processor 115 is an XRMON (Extended Remote Network Monitoring) sampling processor that uses a shared pipeline implementation and that uses a packet counter caching technique. Of course, the packet sampling processor 115 may be implemented based on other topologies so long as it can perform the packet counter caching technique as described below. As known to those skilled in the art, XRMON is a proprietary specification that defines a method for statistical sampling of network traffic in order to provide traffic analysis. XRMON is one solution to provide network-wide traffic analysis with typically very low overhead requirements on the network resources.

Figure 2:
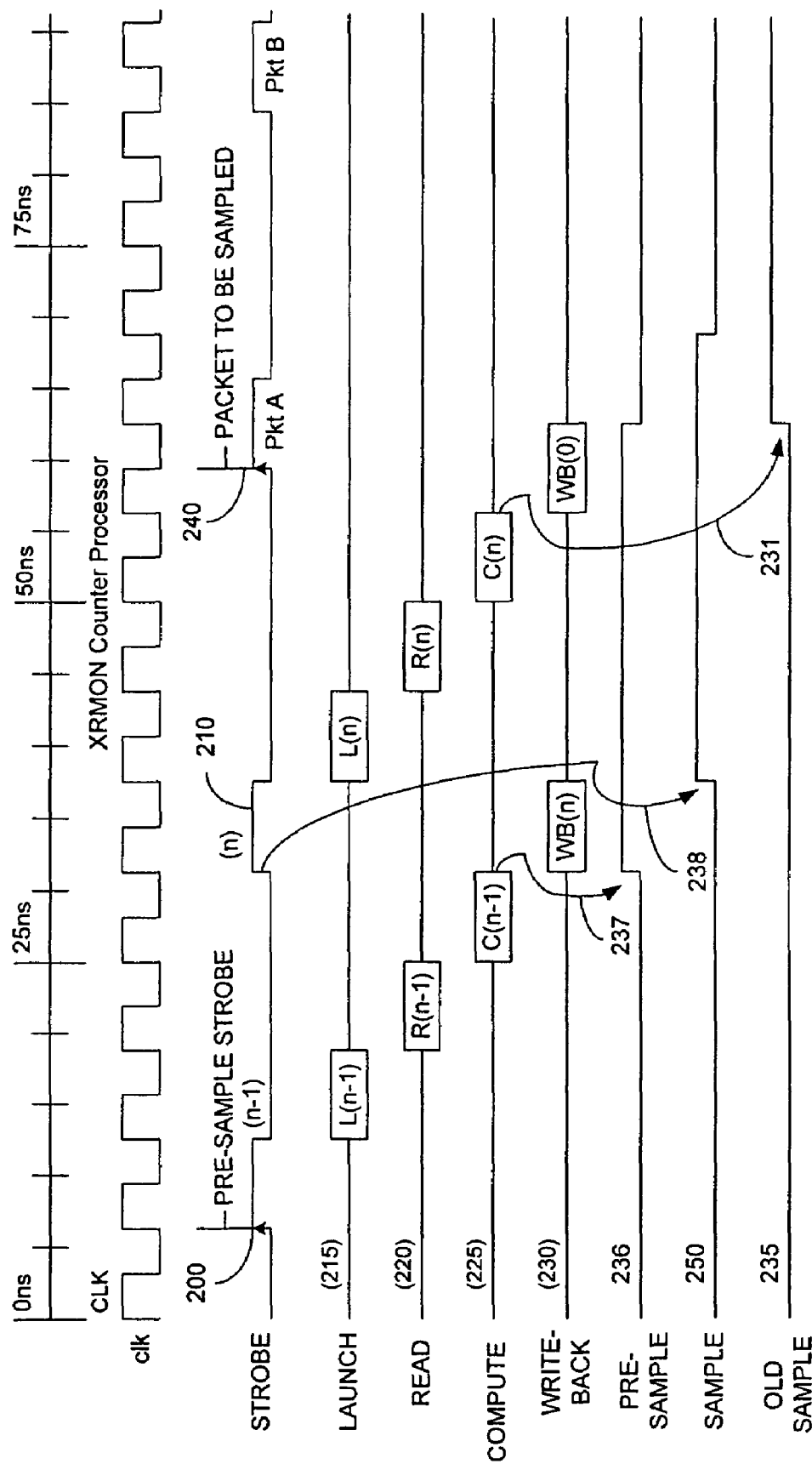
FIG. 2 is a timing diagram illustrating a method in accordance with an embodiment of the invention.

FIG. 2 is a timing diagram illustrating a method of sampling network packet values, as performed by an embodiment of the packet sampling processor 115. The following terms are defined below for purposes of clarification of the technical details:

Pre-sample Strobe—a strobe signal that triggers the generation of a Pre-sample signal;

Pre-sample signal—a pre-sample signal is generated in the Compute stage of a pipeline upon n—1, which enables a sampling station 300 (FIG. 3) and the counter cache 305 (FIG. 3) to start counting. It is different from the pre-sample strobe in that the Pre-sample signal occurs two clock later.

Figure 3:
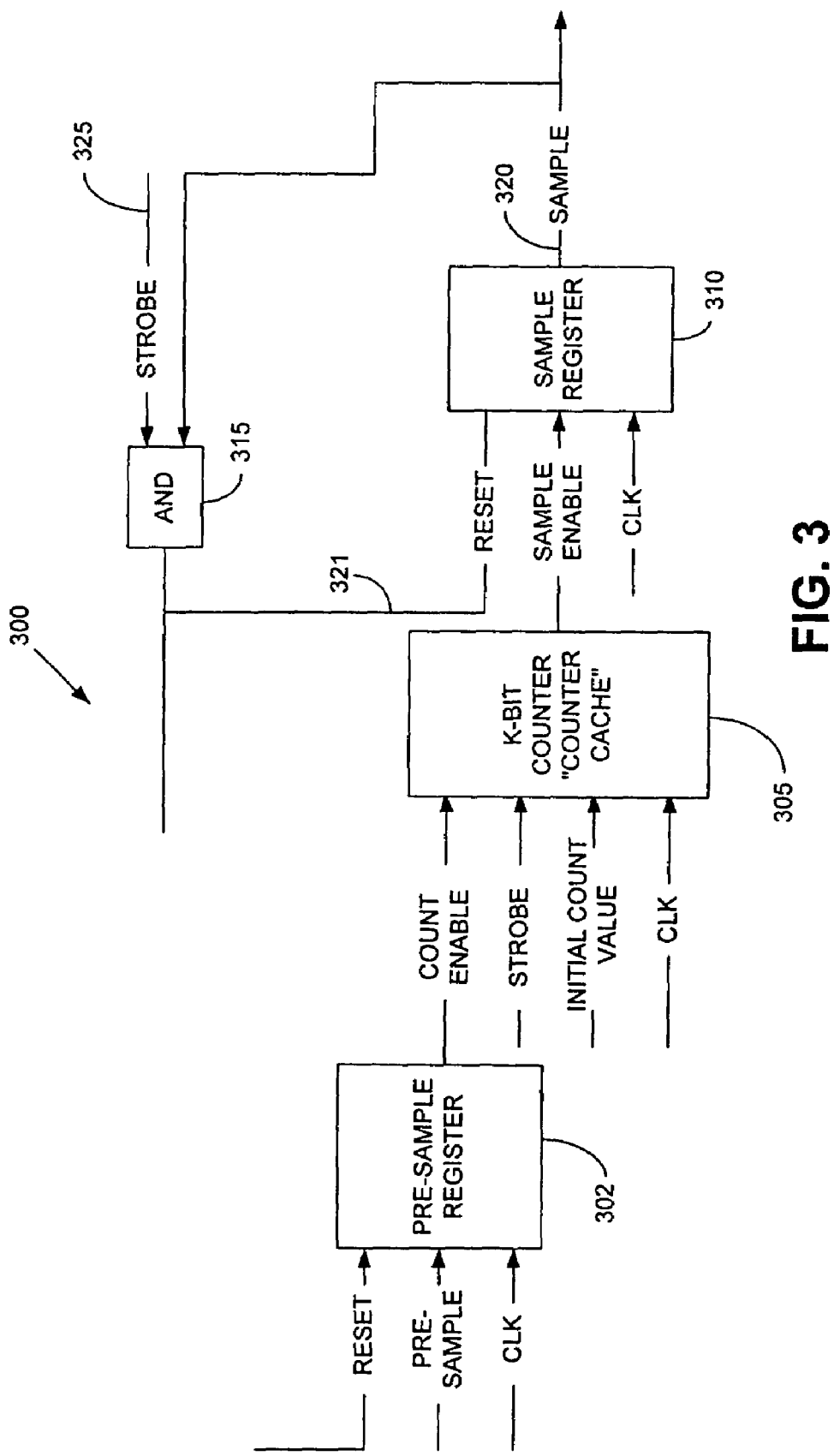
FIG. 3 is a block diagram of a circuit, known as a "sampling station", that can perform caching of packet counter values in accordance with an embodiment of the invention.

Sampling Station—a circuitry 300 (as shown in FIG. 3) that includes, in one embodiment, a counter cache, pre-sample, and sample generation and reset logic.

Figure 5:
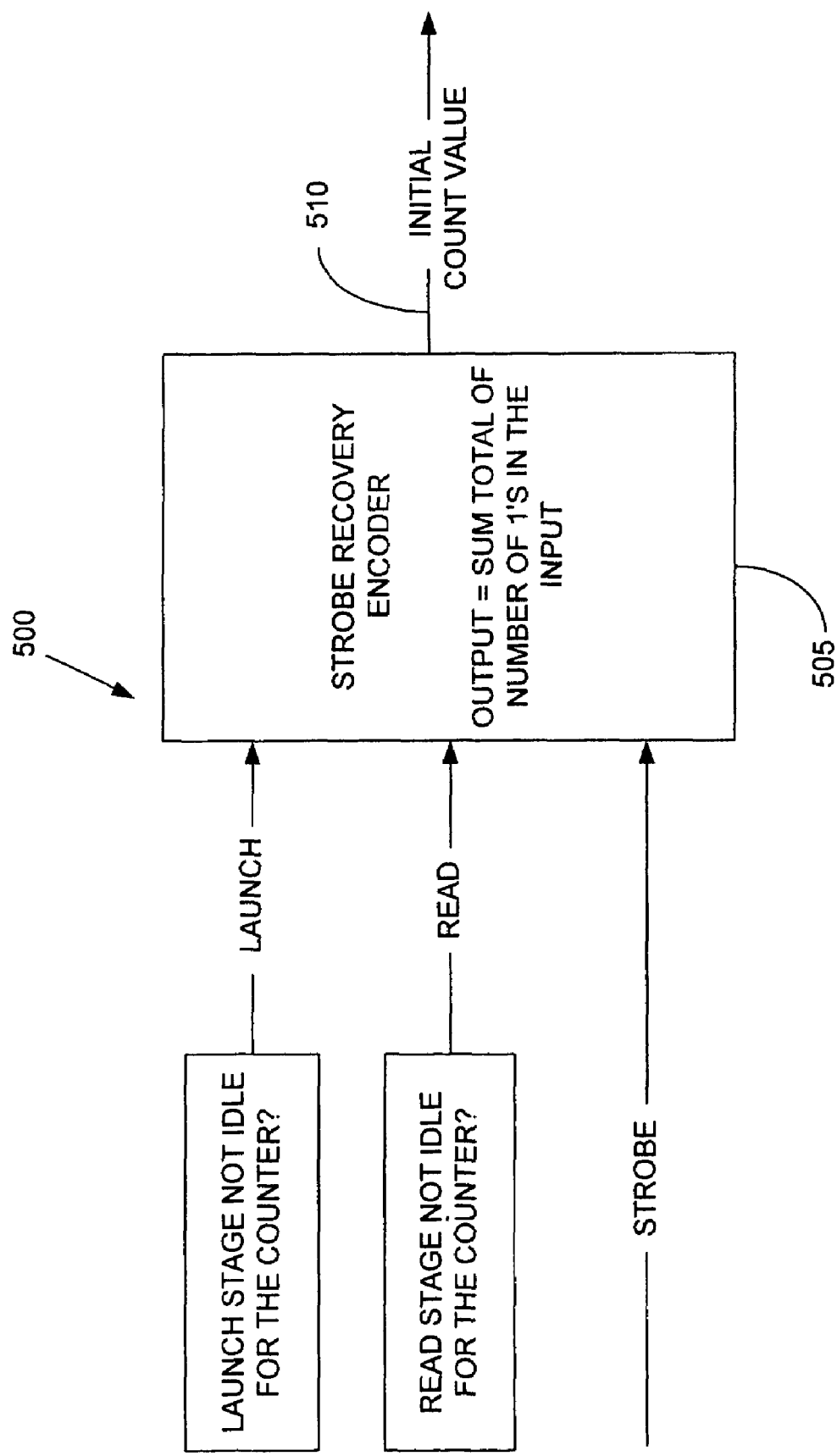
FIG. 5 is a block diagram of a circuit that can synchronize the counter cache and the sampling processor by use of a method of "strobe recovery", in accordance with an embodiment of the invention.

Initial Count Value—An Initial value to be loaded to the counter cache 305. In most cases, this will be zero. In cases where "strobe recovery" is needed, this will be generated by the strobe recovery circuit 500 (FIG. 5).

Strobe Recovery—A method, in one embodiment, to recover missed strobes due to high speed counter update requests.

The CLOCK signal represents a generated clock. The STROBE signal has pulses that occur when a data packet is detected at a switch port of the switch 105 (FIG. 1). The sample signal has pulses that trigger a sampling of the packets that are counted based on the pulses in the STROBE signal.

The generation of the sample signal by use of shared pipeline resources is first discussed as a background for understanding the need for an embodiment of the present invention. In one embodiment, the shared pipeline resource is a specialized pipeline that performs computing operations on a series of counters. In an embodiment, the shared pipeline may be implemented as, for example, the packet sampling processor 115 (FIG. 1), although the shared pipeline may be implemented in other suitable component stages. The shared pipeline can be, for example, a four-stage pipeline including the following elements:

1. Launch stage, which determines what instruction/counter pair to be issued into the pipeline.
2. Read Counter stage, which reads the content of the counter from memory.
3. Compute stage, which perform computation on the counter, for example, to increment or decrement its values.
4. Write Counter stage, which writes back the results generated by the compute stage to memory.

Each STROBE signal will cause a new instruction to be launched into the pipeline for a particular counter, which will be assumed to be counter C herein unless explicitly noted otherwise. When an n sample strobe pulse 210 arrives, the shared pipeline resources will, for example, first launch (215) instructions, read (220) the instructions from memory, perform (225) calculations, and write (230) the results back to memory. As a result, a sample pulse 235 may typically not be generated until, for example, four (4) CLOCK (CLK) pulses after the n sample strobe pulse 210 had arrived. The sample pulse 235 permits the sampling of the packets that are detected at the ports of the switch 105. There is significant delay in being able to generate the sample pulse 235 after the arrival of the n sample strobe pulse 210 because the shared pipeline resources are being used for the processing steps (215) through (230) (this condition is illustrated by arrow 231 in FIG. 2). As a result, the shared pipeline resources will not be able to permit the processing of the sample pulse 235 until the processing steps (215) through (230) are completed. Therefore, if a subsequent strobe pulse 240 arrives, a sample pulse in the sample signal 235 can not be generated, and this may result in an inaccurate sampling count.

In accordance with an embodiment of the invention, a pre-sampling step is performed as follows. A pre-sample strobe 200 is a specific STROBE signal that will trigger the generation of a pre-sample signal 236 during the compute stage (225). For example, with k=1, the pre-sample strobe will typically be the n−1 strobe. When the n−1 pre-sample strobe pulse 200 appears in the input, the n−1 pre-sample signal 236 is loaded into a sampling station 300 (see FIG. 3) during the compute stage (225) (this condition is illustrated by arrow 237 in FIG. 2), and this will update the values in the counter cache 305 (FIG. 3). When the next pulse strobe arrives (n strobe pulse 210), a sample pulse 250 can be generated without significant delay after the arrival of the n strobe pulse 210 (this condition is illustrated by arrow 238 in FIG. 2). For example, by loading the n−1 pre-sample strobe pulse 200 into the counter cache 305, the counter cache value is updated. This updated value is a pre-sample value that can be updated when the next strobe pulse (n strobe pulse 210) arrives and the sample pulse 250 is generated. The counter cache 305 permits the sample pulse 250 to be generated within a minimum time, for example, one CLOCK pulse after the n strobe pulse 210 arrives because a different resource is counting the packet arrivals based on the strobe pulses, as compared to the resource that permits the generation of the sample pulse 250 after the n strobe pulse 210 arrives.

FIG. 3 is a block diagram of a circuit that can perform caching of packet counter values in accordance with an embodiment of the invention. The circuit, known as a sampling station 300, can update its counter cache value based upon the loading of the n−1 pre-sample strobe pulse 200 into the counter cache 305. Each counter in the sampling processor 115 will have a corresponding sampling station 300. Note that once the sampling station 300 is activated by the pre-sample signal, and it functions in parallel and operates autonomously to that of the pipeline resource. This may typically give rise to a potential issue of synchronization between the sampling processor 115 and the sampling station 300, which will be resolved by the method of "strobe recovery" that will be explained later.

In one embodiment, the circuit 300 includes a pre-sample register 302, a k-bit counter cache 305, a sample register 310 and a bit-wise AND gate 315.

The input to the circuit 300 typically includes a Pre-sample signal 236 generated by the sampling processor 115 during its Compute stage (225), a STROBE signal from the input to the counter pipeline and a clock signal as this circuit 300 includes primarily sequential logic. The output of this circuit 300 is the advance generation of the sample signal.

The pre-sample register 302 is a memory element used to hold the Pre-sample signal stable until the reset condition is met. The k-bit counter 305 is a small counter cache to count down to the final strobe. The sample register 310 is used to hold the sample signal. The bit-wise AND gate 315 is used to generate the reset condition to both the pre-sample register 302 and the sample register 310.

The Pre-sample signal 236, generated during the computation stage (225) of the (n−1) strobe, set the pre-sample register 302 to 1. The counter cache 305, upon being enabled by the pre-sample register 302, starts loading the Initial Count Value for the counter and increment by 1 every time an input strobe signal is asserted. In some application, like that shown in the examples, the Initial Count Value will be logic 0. In other applications, an Initial Count Value will need to be generated by a "strobe recovery" circuitry 500, which will be described later on. In a case where k=1 and the Initial Count Value is 0, the counter will wait for 1 additional strobe to occur. Once this happens, the counter cache 305 will set its output to 1, causing the sample register 310 to be set, thereby generating the final sample strobe 320. The circuit 300 is reset 321 upon the sample output 320 being set and the arrival of a new strobe 325, which is handled by the feedback path as indicated in the bit-wise AND operation with the strobe and the sample output signal.

Since the counter for caching the pre-sample values can be, for example, a k-bit counter (where k can equal a small value such as k=1, k=2, or k=3), an embodiment of the invention permits a great savings in chip resources since the k-bit counter will not require significant chip resources when compared to the previous approach of assigning a pair of counters for each switch port. At the same time, the pre-sampling method avoids the latency problem of a shared pipelined design, since the packet values are already pre-sampled when an n-strobe pulse arrives. The sample pulse has to be generated in a timely manner to ensure the correct sampling of packets that comes in at a very high rate for high-speed networking switches.

Figure 4:
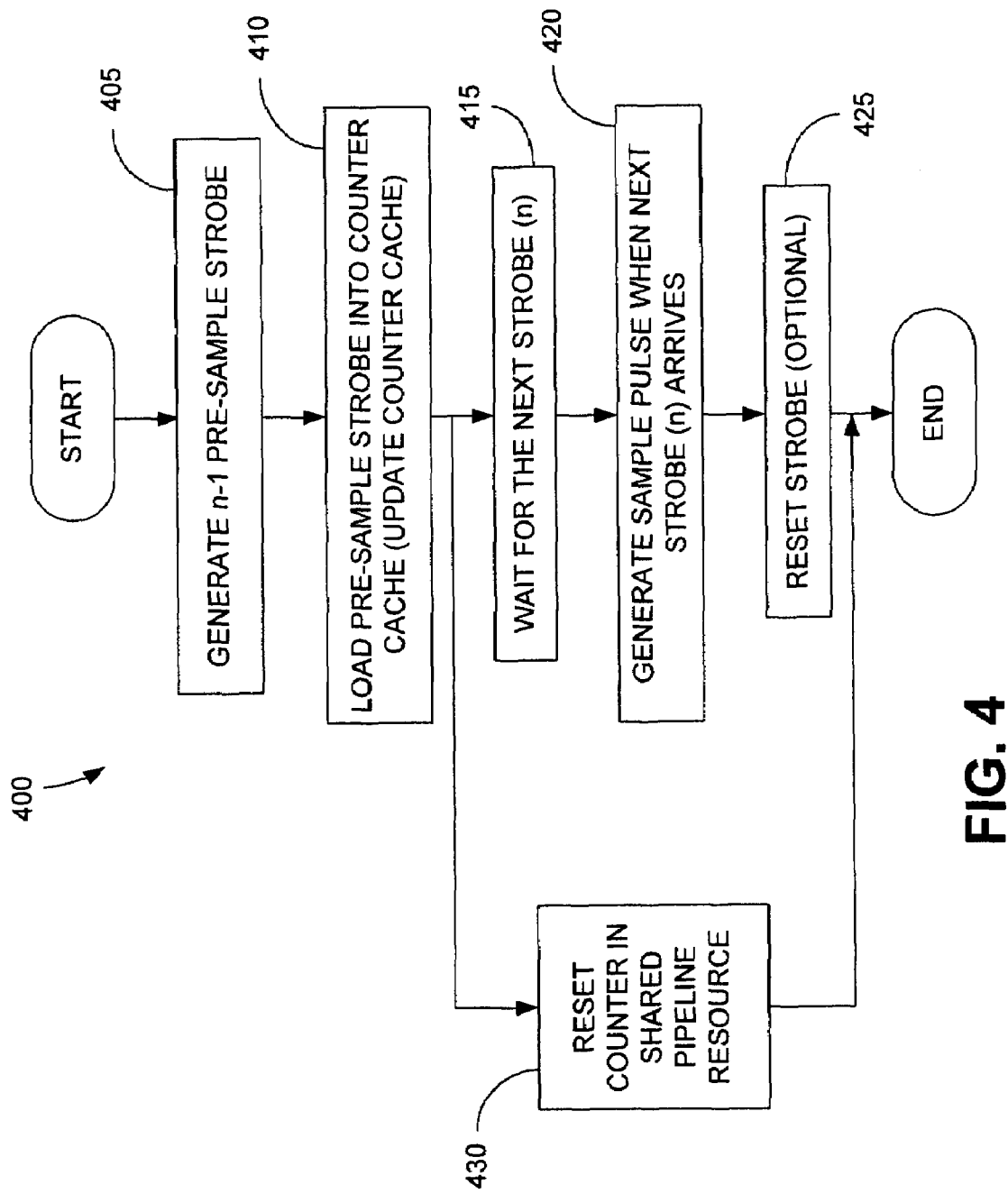
FIG. 4 is a flowchart of a method in accordance with an embodiment of the invention.

FIG. 4 is a flowchart of a method 400 of performing sampling of packet values, in accordance with an embodiment of the invention. An n−1 pre-sample strobe is first generated (405). The n−1 pre-sample strobe is then loaded (410) into a counter cache. As a result, counter cache is updated by the loading of the n−1 pre-sample strobe. The method 400 then waits (415) for the next strobe (n strobe). When the n strobe arrives, a sample pulse is generated (420) indicating a sampling of packet values. The strobe may be optionally reset (425). In addition, after the pre-sample strobe is loaded (410) into the counter cache, a reset counter in the shared pipeline resource may be reset (430).

For a more advanced implementation with a very high-speed counter update requirement, strobes may not be accounted for by the sampling station 300 if they arrive after the pre-sample strobe 200 and before the Pre-sample signal 236 is generated to activate the sampling station 300, which, for a four stage pipeline, is a two clock window. This is because the working of the sampling station 300 assumes no other strobes will arrive after the pre-sample strobe 200 and the assertion of the pre-sample signal 236. If a strobe happens do fall in this two-clock window, however, the counters in the sampling processor 115 will be updated properly, but the counter cache 305 inside the sampling station 300 will not update. This is because the sampling station 300 will not be enabled until the pre-sample signal 236 has been asserted, the strobes will be ignored and thus causes improper generation of the sample signal due to strobes unaccounted for by the sampling station 300. To resolve this, a method known as "strobe recovery" is used to properly synchronize between the sampling processor 115 and the sampling station 300, in accordance with an embodiment of the invention.

The method of strobe recovery typically requires a circuit 500 that generates an Initial Count Value such that the counter cache 305 will properly compensate for strobes that happens before the Pre-sample signal 236 is asserted. The general concept is that the value to initialize the counter cache 305 is the sum of prior pipe stages that has an operation for the counter. This is based on the realization that each non-idle pipe stage on the counter represents a strobe that was issued prior to the pre-sample signal generation.

The circuit 500 in FIG. 5 assumes, in one embodiment, that a classic pipeline design includes a launch, read, compute and write stages to perform the launch (215), read (220), compute (225), and writeback (230) operations, respectively. Thus, the pipe stages that would take place before the generation of the pre-sample signal 236 would be the launch and read stage, together with the strobe at the present stage. The encoder block 505 is a combinatorial circuit that will be used for summing the total number of 1's in the input. The encoder output 510 will then feed directly to the Initial Count Value to be loaded to the counter cache inside the sampling station 300 (FIG. 3). For example, consider a case where 3 strobes were asserted in a row with a 2-bit counter cache. Let us assume that the first strobe is the pre-sample strobe that would cause the pre-sample signal to be generated. The other two strobes would have been missed if the circuit 500 presented in FIG. 5 were not used. However, with the strobe recovery circuit 500 depicted in FIG. 5 implemented, the Initial Count Value would be 2 in this case, as the two later strobes has propagated themselves down to the launch and read stage through normal pipeline mechanism. The counter cache 305 will then be loaded with an Initial Count Value of 2 instead of 0, meaning that 2 strobes had already been accounted for and only one additional strobe would be needed to set the "sample" signal.

Figure 6:
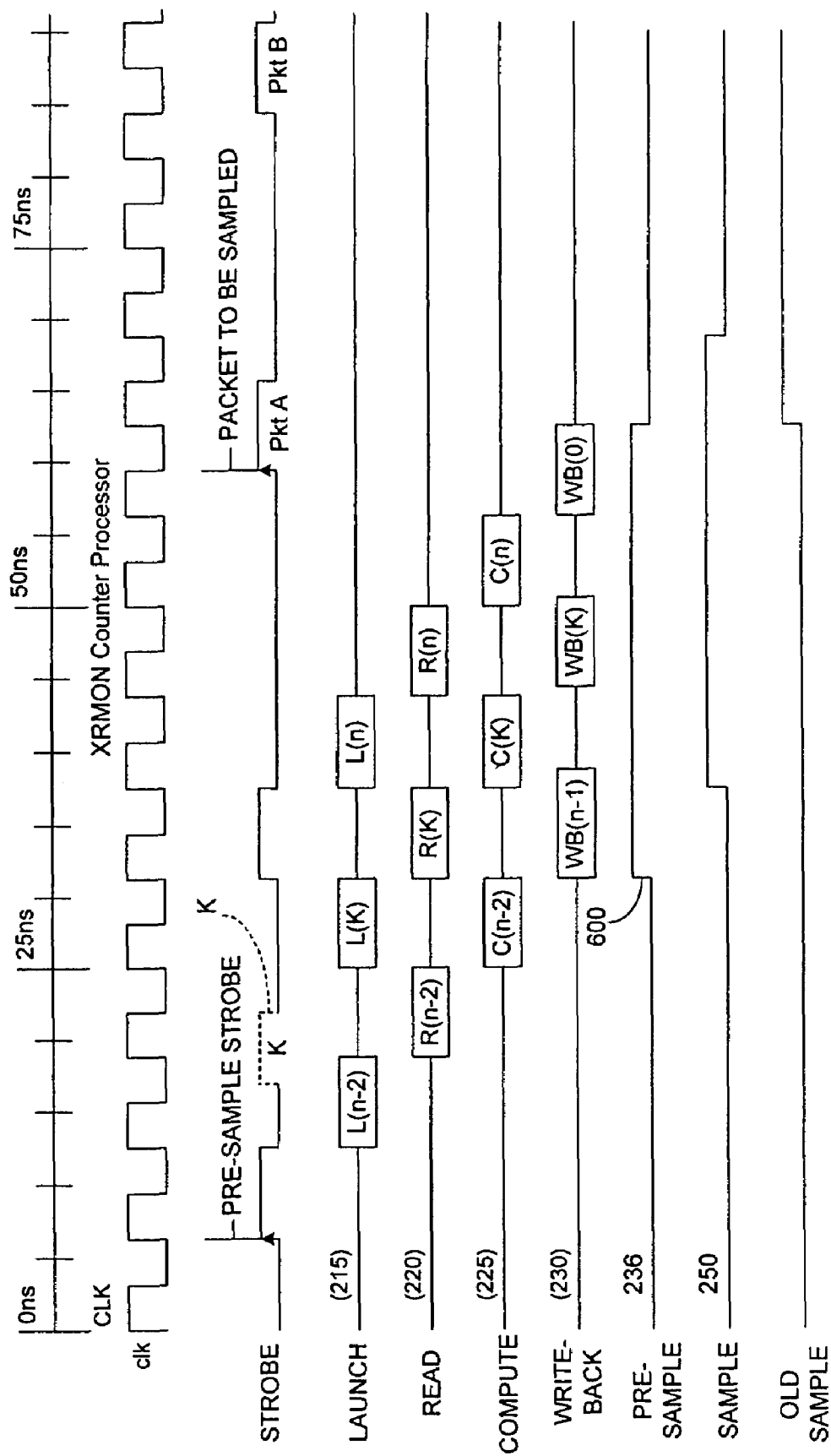
FIG. 6 is a timing diagram illustrating a method of strobe recovery, in accordance with an embodiment of the invention.

FIG. 6 is a timing diagram illustrating a method of strobe recovery, in accordance with an embodiment of the invention. The sampling processor 115 will still update the strobe properly. The sampling station 300 will typically not "see" the strobe K, because the pre-sample signal 236 is not generated until at a time (indicated by 600 in FIG. 6), which is at a time after the occurrence of strobe K. With the method of strobe recovery in accordance with an embodiment of the invention, the strobe K will be accounted for since R(K) is detected to be in the pipeline resource. Note that in this example, it is assumed that pre-sample is generated at n−2 on a Q-bit counter cache implementation.

An embodiment of the invention enables the use of a pipelined design for a sampling processor to share on-chip counter resources. An embodiment also enables the fast generation of sample signals and avoids the problems due to latency that is introduced by a shared pipeline counter design. An embodiment of the invention also permits savings in chip resources that were required by previous approaches, and the lower chip area requirement can lead to a lower costs for products that implement an embodiment of the invention.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of caching counter values in network packet traffic sampling, the method comprising:
   generating a pre-sample strobe;
   loading the pre-sample strobe into a counter cache;
   generating a pre-sample signal in response to the pre-sample strobe;
   generating a strobe when a packet is received at a port; and
   generating a sample pulse after generating the strobe, wherein the sample pulse samples the packet that is detected at the port and wherein the pre-sample signal reduces a delay between the strobe and the sample pulse.

2. The method of claim 1 wherein the sample pulse permits the sampling of packet values.

3. The method of claim 1, further comprising:
   resetting a counter in a shared pipeline resource.

4. The method of claim 1, wherein the counter cache is implemented by a k-bit counter, where k is a low number integer.

5. The method of claim 1 wherein the sample pulse is generated within a small time frame after the strobe is generated.

6. An article of manufacture, comprising:
   a program on a computer readable medium having stored thereon instructions to permit a network device to perform packet sampling, wherein the instructions:
   generate a pre-sample strobe;
   load the pre-sample strobe into a counter cache;
   generate a pre-sample signal in response to the pre-sample strobe;
   generate a strobe when a packet is received at a port; and
   generate a sample pulse after generating the strobe, wherein the sample pulse samples the packet that is detected at the port and wherein the pre-sample signal reduces a delay between the strobe and the sample pulse.

7. An apparatus for caching counter values in network packet traffic sampling, the apparatus comprising:
   means for generating a pre-sample strobe;
   coupled to the generating means, means for loading the pre-sample strobe into a counter cache;
   coupled to the loading means, means for generating a pre-sample signal in response to the pre-sample strobe;
   coupled to the loading means, means for generating a strobe when a packet is received at a port; and
   coupled the waiting means, means for generating a sample pulse after generating the strobe, wherein the sample pulse samples the packet that is detected at the port and wherein the pre-sample signal reduces a delay between the strobe and the sample pulse.

8. An apparatus for counting packet values and for sampling, the values, the apparatus comprising:
   a packet sampling processor including a counter cache, the packet sampling processor responsive to a pre-sample strobe so that the pre-sample strobe updates the counter cache, wherein the processor generates a pre-sample signal in response to the pre-sample strobe, wherein the processor generates a strobe when a packet is received at a port, wherein the processor generates a sample pulse after generating the strobe, and wherein the sample pulse samples the packet that is detected at the port and wherein the pre-sample signal reduces a delay between the strobe and the sample pulse.

9. The apparatus of claim 8, wherein the counter cache sample pulse permits the sampling of packet values.

10. The apparatus of claim 9, wherein the counter cache is implemented by a k-bit counter, where k is a low number integer.

11. The apparatus of claim 8 wherein the sample pulse is generated within a small time frame after the strobe is generated.

12. The apparatus of claim 8, further comprising:
    a sampling station configured to perform caching of packet counter values.

13. An apparatus for performing a sampling logic function, comprising:
    a sampling station including:
      means for setting a pre-sample register in response to a pre-sample strobe;
      means for initializing a counter cache in response to a pre-sample signal that is generated in response to the pre-sample strobe;
      means for generating a strobe when a packet is received at a port;
      means for generating a sample pulse in response to the strobe, wherein the sample pulse samples the packet that is detected at the port and wherein the pre-sample signal reduces a delay between the strobe and the sample pulse; and
      means for resetting the sampling station.

14. A method for performing a sampling logic function by use of a sampling station, the method comprising
    setting a pre-sample register in response to a pre-sample strobe;
    initializing a counter cache in response to a pre-sample signal that is generated in response to the pre-sample strobe;
    generating a strobe when a packet is received at a port;
    generating a sample pulse in response to the strobe, wherein the sample pulse samples the packet that is detected at the port and wherein the pre-sample signal reduces a delay between the strobe and the sample pulse; and resetting the sampling station.

15. An apparatus for caching packet counter values, the apparatus comprising:
 a pre-sample register configured to hold a pre-sample signal until receiving a reset condition, wherein the pre-sample signal is generated in response to a pre-sample strobe;
 a counter cache coupled to the pre-sample register and configured to generate a sample enable signal in response to a strobe, where the strobe indicates that a packet is received at a port;
 a sample register coupled to the counter cache and configured to hold a sample signal, wherein the sample signal samples the packet that is detected at the port and wherein the pre-sample signal reduces a delay between the strobe and the sample pulse; and
 a bit-wise AND gate configured to generate the reset condition to the pre-sample register and the sample register.

16. The method of claim 1, wherein the pre-sample signal is generated prior to generating the sample pulse.

17. The method of claim 1, wherein in response to the strobe, launching instructions in shared pipeline resources.

18. The method of claim 17, wherein the instructions comprises launch instructions, read instructions, calculation instructions, and write instructions.

19. The method of claim 18, further comprising:
 using the read instruction to detect a strobe that is generated prior to generating the pre-sample signal.

20. The article of manufacture of claim 6, wherein the pre-sample signal is generated prior to generating the sample pulse.

21. The article of manufacture of claim 6, wherein in response to the strobe, pipeline instructions in shared pipeline resources are launched.

22. The article of manufacture of claim 21, wherein the pipeline instructions comprises launch instructions, read instructions, calculation instructions, and write instructions.

23. The article of manufacture of claim 22, wherein the instructions use the read instruction to detect a strobe that is generated prior to generating the pre-sample signal.

24. The apparatus of claim 8, wherein the pre-sample signal is generated prior to generating the sample pulse.

25. The apparatus of claim 8, wherein in response to the strobe, the processor launches instructions in shared pipeline resources.

26. The apparatus of claim 25, wherein the instructions comprises launch instructions, read instructions, calculation instructions, and write instructions.

27. The apparatus of claim 26, wherein the processor uses the launch instruction and read instruction to detect a strobe that is generated prior to generating the pre-sample signal.

28. The apparatus of claim 27, wherein the processor comprises a strobe recovery encoder that uses the launch instruction and read instruction to detect a strobe that is generated prior to generating the pre-sample signal.

29. The apparatus of claim 13, wherein the pre-sample signal is generated prior to generating the sample pulse.

30. The method of claim 14, wherein the pre-sample signal is generated prior to generating the sample pulse.

31. The apparatus of claim 15, wherein the pre-sample signal is generated prior to generating the sample pulse.

* * * * *

UNITED STATES PATENT AND TRADEMARK OFFICE
CERTIFICATE OF CORRECTION

| | | |
|---|---|---|
| PATENT NO. | : 7,221,655 B2 | Page 1 of 1 |
| APPLICATION NO. | : 10/098880 | |
| DATED | : May 22, 2007 | |
| INVENTOR(S) | : King Luk | |

It is certified that error appears in the above-identified patent and that said Letters Patent is hereby corrected as shown below:

In column 8, lines 15-16, in Claim 8, after "sampling" delete ",".

Signed and Sealed this

Sixteenth Day of February, 2010

David J. Kappos
*Director of the United States Patent and Trademark Office*